US009178978B2

(12) United States Patent
Park (10) Patent No.: US 9,178,978 B2
(45) Date of Patent: Nov. 3, 2015

(54) METHOD OF SELF-CALLING BY SETTING TIME OF MOBILE TERMINAL, SYSTEM THEREOF, AND RECORDING MEDIUM STORING THE SAME

(75) Inventor: Min Soo Park, Gyeonggi-do (KR)

(73) Assignee: S1 Corporation (KR)

( * ) Notice: Subject to any disclaimer, the term of this patent is extended or adjusted under 35 U.S.C. 154(b) by 502 days.

(21) Appl. No.: 13/521,858

(22) PCT Filed: Jan. 22, 2010

(86) PCT No.: PCT/KR2010/000408
§ 371 (c)(1),
(2), (4) Date: Jul. 12, 2012

(87) PCT Pub. No.: WO2011/087175
PCT Pub. Date: Jul. 21, 2011

(65) Prior Publication Data
US 2012/0295572 A1 Nov. 22, 2012

(30) Foreign Application Priority Data
Jan. 13, 2010 (KR) .................... 10-2010-0003023

(51) Int. Cl.
H04W 4/22 (2009.01)
H04M 1/725 (2006.01)
H04W 76/00 (2009.01)

(52) U.S. Cl.
CPC ........ H04M 1/72536 (2013.01); H04W 76/007 (2013.01); H04W 4/22 (2013.01)

(58) Field of Classification Search
USPC ............................. 455/404.1, 423, 414.1, 411
See application file for complete search history.

(56) References Cited

U.S. PATENT DOCUMENTS

| 7,529,677 | B1* | 5/2009 | Wittenberg ................... 704/275 |
| 7,844,034 | B1* | 11/2010 | Oh et al. ........................ 379/45 |
| 2006/0258376 | A1* | 11/2006 | Ewell ......................... 455/456.6 |
| 2009/0221262 | A1* | 9/2009 | Miwa et al. ................ 455/404.1 |
| 2009/0298469 | A1* | 12/2009 | Kim et al. ..................... 455/411 |

(Continued)

FOREIGN PATENT DOCUMENTS

| KR | 20030033127 A | 5/2003 |
| KR | 20060034898 A | 4/2006 |

(Continued)

OTHER PUBLICATIONS

International Search Report for Application No. PCt/KR2010/000408 dated Feb. 24, 2011.

Primary Examiner — Charles Appiah
Assistant Examiner — Margaret G Mastrodonato
(74) Attorney, Agent, or Firm — Lerner, David, Littenberg, Krumholz & Mentlik, LLP (57) ABSTRACT

A method of self-calling and emergency reporting by setting a time in a mobile terminal, a system thereof, and a recording medium storing the same are provided. When a particular pattern of a user is input to the mobile terminal while the self-calling program is being executed, the mobile terminal determines, whether or not the particular pattern is authentication data previously input by the user, and changes a mode to a self-reception mode previously determined by the user. Also, the mobile terminal performs voice recognition, executes a previously stored policy according to the user's voice recognition and a response pattern according to the query, and changes a mode to a standby mode when a predetermined condition is satisfied.

27 Claims, 9 Drawing Sheets

(56) References Cited

U.S. PATENT DOCUMENTS

2011/0195699 A1* 8/2011 Tadayon et al. ............... 455/418
2013/0005295 A1* 1/2013 Park et al. ................. 455/404.2

FOREIGN PATENT DOCUMENTS

| KR | 20070039803 A | 4/2007 |
| KR | 20080013222 A | 2/2008 |

* cited by examiner

METHOD OF SELF-CALLING BY SETTING TIME OF MOBILE TERMINAL, SYSTEM THEREOF, AND RECORDING MEDIUM STORING THE SAME

CROSS REFERENCE TO RELATED APPLICATIONS

The present application is a national phase entry under 35 U.S.C. §371 of International Application No. PCT/KR2010/000408, filed Jan. 22, 2010, published in Korean, which claims priority from Korean Patent Application No. 10-2010-0003023, filed Jan. 13, 2010, all of which are incorporated herein by reference.

TECHNICAL FIELD

The present invention relates to mobile security and, more particularly, to a method of self-calling and emergency reporting by setting a time in a mobile terminal capable of allowing a user of a mobile terminal to set a time at which self-calling and emergency reporting are to be applied, operate the mobile terminal according to an input of a particular pattern during a pre-set period of time to output an input voice or image, drive a countermeasure according to a stored query and response to call attention to his or her surroundings, and induce a guardian and a security company to react swiftly, a system thereof, and a recording medium storing the same.

BACKGROUND ART

Humans' efforts for protecting tangible/intangible property or possessions have continuously developed and the range of security has been diversified.

Security coverage, which was limited to a safe provided in homes or offices to keep valuables therein, a prevention of computer hacking, guard or escort for personal safety to protect security of celebrities or public figures, or the like, has been expanded to an on-site monitoring closed circuit TV, an access control system, a burglar alarm system, a stolen vehicle tracking system, and even a fence security system for protecting important facilities.

A positioning service of members using a mobile communication terminal used for an emergency reaction service includes a GPS (global positioning system) scheme, a GPSOne scheme provided by mobile carriers, and the like, and recently, DGPS (differential GPS), a scheme of obtaining more accurate location by correcting factors causing an error by using reference point coordinates which are already known as a relative positioning type GPS measurement scheme and reducing an error to the maximum level is about to be commercialized.

Currently provided mobile security services employs a method allowing a subscriber, having an emergency, to press a particular emergency rescue button configured in a terminal or directly make a call to a guardian or a security company to inform them about the emergency.

However, in the case of such a security service, the emergency rescue buttons is required to be configured in the mobile terminal itself, and here, there is not much demand for such a functional mobile terminal, making it difficult for manufacturers to positively manufacture the mobile terminals, and in line with the recent trend of considering design very highly, popularization of functional mobile terminals is hardly anticipated.

In addition, in order for a user to inform someone about an emergency through a call, the user should select a person to receive his or her call along with a call button, and such manipulation is substantially impossible in an emergency.

DISCLOSURE

Technical Problem

The present invention has been made in an effort to provide a method of self-calling and emergency reporting by setting a time in a mobile terminal having advantages of allowing a user of a mobile terminal, who is in a dangerous situation during a pre-set period of time, to operate the mobile terminal according to a particular pattern input to output an input voice or image, drive a countermeasure according to a stored query and response to call attention to his or her surroundings, and induce a guardian and a security company to react swiftly.

The present invention has also been made in an effort to provide a system of self-calling and emergency reporting by setting a time in a mobile terminal employing a method of self-calling and emergency reporting by setting a time in a mobile terminal.

The present invention has also been made in an effort to provide a recording medium storing a method of self-calling and emergency reporting by setting a time in a mobile terminal, as a program that can be executed in a computer.

Technical Solution

An exemplary embodiment of the present invention provides a method of self-calling and emergency reporting by setting a time in a mobile terminal. The method includes (a) continuing execution of a self-calling program according to information regarding an execution time duration of the self-calling program of a mobile terminal input by a user; (b) when a particular pattern of the user is input to the mobile terminal while the self-calling program is being executed, determining, by the mobile terminal, whether or not the particular pattern is authentication data previously input by the user, and changing the mobile terminal into a self-reception mode predetermined by the user; (c) outputting a query previously stored in a database to the user through the mobile terminal to perform voice recognition; (d) executing a policy previously stored in the database according to the user's voice recognition and a response pattern according to the query; and (e) changing the mobile terminal to a standby mode when a personal identification number for termination is input by the user or according to an end time of the self-calling program.

The step of (a) may include: when the self-calling program of the mobile terminal is executed, notifying the user about a user reception mode of the mobile terminal and a connection state of an external device connected to the mobile terminal.

The step of (a) may further include: when the self-calling program is executed, displaying a remaining execution time duration, and lengthening the remaining execution time duration of the self-calling program according to a user request before the remaining execution time duration lapses.

The information regarding an execution time duration of the self-calling program may be input by the user in advance or may be input by the user after the self-calling program is executed.

The step of (a) may further include: executing a wakeup event for preventing the mobile terminal from entering a suspend mode at every predetermined period.

The particular pattern may include at least any one of a user's motion pattern, a keypad input pattern of the mobile terminal, a touch pattern of the mobile terminal, an emergency button input of the mobile terminal, and the user's voice.

The step of (b) may include: comparing a user's particular pattern input to the mobile terminal with authentication data of the user previously stored in the database to determine whether or not they are identical; and when the particular pattern and the user's input data are identical, performing user authentication.

The step of (b) may further include: when the particular pattern is authentication data previously input by the user, changing the mobile terminal to a bell sound mode; and when the mobile terminal is changed to the bell sound mode, The step of (c) may include: outputting a bell sound from the mobile terminal which has been changed to the self-reception mode, and checking call incoming from the user; interrupting an output of a bell sound according to an external call when the call incoming is performed and recording a sell-calling state in the database; when the call incoming is performed, determining whether or not a phone number of the external call is identical to a phone number stored in the database; and when the phone number of the external call is identical to the phone number stored in the database, changing the mobile terminal to a three-party call mode, and when the phone number of the external call is different from the phone number stored in the database, interrupting incoming of the external call.

The step of (c) may further include: outputting the query stored in the database to the user; when the user's voice is input according to the query, determining whether or not the user's voice according to the query is identical to the user's voice previously stored in the database; and when the user's voice according to the query is identical to the user's voice previously stored in the database, checking user's response information.

In the step of (e), after the policy stored in the database is executed, the self-reception mode of the mobile terminal may be terminated.

The step of (e) may include: when data different from the user's specific personal identification number is input to the mobile terminal, maintaining the self-reception mode.

The database may include a memory installed in the mobile terminal or an external database server.

The step of (b) may include: when the particular pattern is authentication data previously input by the user, storing at least any one of user data among the user's current location information, the user's phone number, the user's input voice, and video data input to a camera module of the mobile terminal in the database; and transmitting the user data to a third party previously stored in the database.

Another embodiment of the present invention provides a system of self-calling and emergency reporting by setting a time in a mobile terminal. The system includes a data input unit for receiving a particular pattern from a user when an emergency occurs, receiving the user's response according to a query previously stored in a database, and receiving the user's personal identification number for termination; a self-diagnosing unit for checking a user reception mode of the mobile terminal and a connection state of an external device connected to the mobile terminal, when information regarding an execution time duration of a self-calling program of the mobile terminal is received from the data input unit; a controller for determining whether or not the input particular pattern is authentication data previously input by the user to perform user authentication, change a user mode of the mobile terminal to a self-reception mode as a mode previously input to the database according to the user authentication, execute a policy stored in the database according to the user's voice recognition and response pattern, and transmit user data including information regarding the user's current location to a third party previously input to the database; and a voice recognizing unit for performing voice recognition based on the user's response according to the query previously stored in the database.

When a command for executing the self-calling program is received from the data input unit, the self-diagnosing unit may display a remaining execution time duration of the self-calling program, and when a request for lengthening execution of the self-calling program is received from the data input unit before the remaining execution time duration lapses, the self-diagnosing unit may lengthen the remaining execution time duration of the self-calling program.

The information regarding the execution time duration of the self-calling program may be previously input by the user or may be input after the self-calling program is executed.

The system may further include: a wakeup event generating unit for executing a wakeup event for preventing the mobile terminal from entering a suspend mode at every particular period.

The particular pattern may include at least any one of a motion pattern of the mobile terminal performed by the user, a keypad input pattern of the mobile terminal, a touch pattern of the mobile terminal, an emergency button input of the mobile terminal, and a particular voice input by the user.

The controller may include: a main controller for determining whether or not the input particular pattern is authentication data previously input by the user to perform user authentication, and execute the policy stored in the database according to the user's voice recognition and response pattern; a reception controller for changing the user mode of the mobile terminal to the self-reception mode as a mode previously input to the database according to the user authentication; and a communication controller for transmitting the user data including the information regarding the user's current location to a third party previously input to the database.

The reception controller may change the mobile terminal to a bell sound mode, and change the bell sound of the mobile terminal to a predetermined size.

The user data of the communication controller may include at least one of user data among the information regarding the user's current location, the user's phone number, the user's input voice, and video data input to a camera module of the mobile terminal.

When the particular pattern is authentication data previously input by the user, the main controller may automatically execute a particular program installed in the mobile terminal or transmit an emergency rescue message by the mobile terminal.

When a reception tone (or a ring tone) is sent to the mobile terminal according to the change to the self-reception mode, the communication controller may check call incoming from the user, and when the call incoming is performed, the communication controller may interrupt an output of a bell sound by an external call, record a self-call state in the database, and determine whether or not a phone number of the external call is identical to a phone number stored in the database, and when the phone number of the external call is identical to the phone number stored in the database, the communication controller may change the mobile phone to a three-party call mode, and when the phone number of the external call is different from the phone number stored in the database, the communication controller may interrupt the incoming of the external call.

After the main controller executes the policy stored in the database, the main controller may terminate the self-reception mode of the mobile terminal.

When the user's voice is input according to the query stored in the database, the voice recognizing unit may determine whether or not the user's voice according to the query and a user's voice previously stored in the database are identical, and when the user's voice according to the query and a user's voice previously stored in the database are identical, the voice recognizing unit may check the user's response information.

Yet another embodiment of the present invention provides a recording medium storing the foregoing method of self-calling and emergency reporting using a mobile terminal, as a program that can be executed in a computer.

Advantageous Effects

According to embodiments of the present invention, without having to change hardware of a mobile terminal or actually manipulate a call button of a mobile terminal, a user may perform self-calling by inputting a particular pattern and call incoming is simultaneously executed according to an input of the particular pattern, thus swiftly reacting to an emergency. Also, since a call reception tone can be explicitly known to the outside to call attention to the surroundings, a criminal psychology of a person can be suppressed. An emergency can be promptly coped with by simply responding to a control command of a database storing pre-set type data. Since whether to use a vibration mode and an accessory such as an earphone, or the like, is determined in case of executing self-calling, the mobile terminal can be normally operated at a required time, and power consumption according to a standby time and wakeup can be minimized by setting an operation time.

MODE FOR INVENTION

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms such as "-er", "-or" and "module" described in the specification mean units for processing at least one function and operation and can be implemented by hardware components or software components and combinations thereof.

Embodiments of the present invention will be described in detail with reference to the accompanying drawings.

Figure 1:
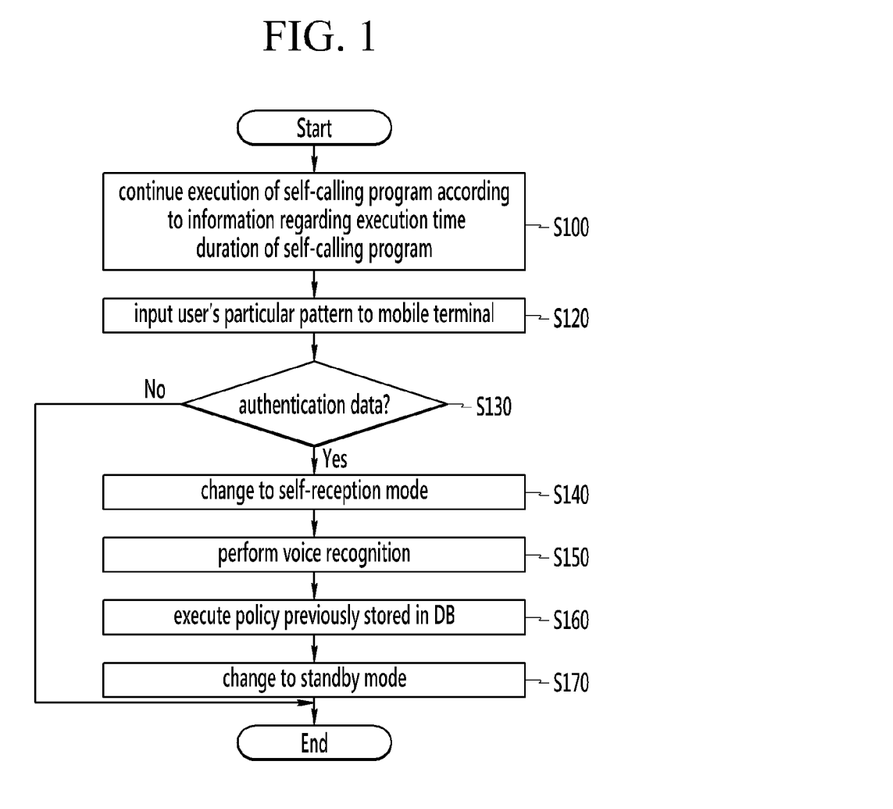
FIG. 1 is a flow chart illustrating a method of self-calling and emergency reporting using a mobile device according to an embodiment of the present invention.

FIG. 1 is a flow chart illustrating a method of self-calling and emergency reporting using a mobile device according to an embodiment of the present invention.

An interface of the mobile device may include a microphone, an input port, a motion sensor, a camera, a GPS, and the like, as an input unit, include a speaker, an LED, and an LCD, as an output unit, and include CDMA, WCDMA, GSM, 3G, and 4G as a communication unit.

With reference to FIG. 1, first, execution of a self-calling program is continued according to information regarding an execution time duration of the self-calling program of a mobile terminal input by a user (S110).

To this end, the self-calling program provided by a particular company is installed in the mobile terminal of the user and executed through a user manipulation.

Meanwhile, when the self-calling program of the mobile terminal is executed, information regarding a user reception mode of the mobile terminal and a connection state of an external device connected to the mobile terminal may be provided to the user.

This is to determine whether or not the mobile terminal is in a bell sound mode at an initial stage in executing the self-calling program, because the mobile terminal should be set in the bell sound mode, rather than vibrations or a mute mode, in order to normally execute the self-calling program.

In addition, when the mobile terminal is connected to an acoustics device including an earphone, a head phone, or the like, or connected to a Bluetooth device, a bell sound of the mobile terminal of the user cannot be heard outside, so it is checked whether or not the mobile terminal is connected to an external device.

Meanwhile, when the self-calling program of the mobile terminal is executed, a remaining time of the self-calling program is displayed on liquid crystal of the mobile terminal, and before the remaining time lapses, the execution time duration of the self-calling program may be lengthened.

The execution time duration of the self-calling program of the mobile terminal may be set by the user in advance or set when the self-calling program is executed. A bell sound in calling the self-calling program or a query to be stored in a database as described hereinafter may be stored according to a user setting.

Meanwhile, when a certain period of time lapses after the self-calling program of the mobile terminal is executed, the mobile terminal may enter a suspend model. Thus, in order to normally execute the self-calling program according to an embodiment of the present invention, the mobile terminal itself may execute a wakeup event at every particular period so as to be prevented from entering the suspend mode.

Since the wakeup event is executed at every particular period, the mobile terminal is prevented from entering a standby mode and the self-calling program according to an embodiment of the present invention is normally executed.

Next, when a particular pattern is input to the mobile device by the user (S120), it is determined whether or not the particular pattern is authentication data previously input by the user (S130).

In order to determine whether or not the particular pattern is authentication data previously input by the user, particular pattern information may be previously stored in a memory provided in the mobile device or an external database server, and when the particular pattern is input by the user, the input particular pattern is compared with the stored particular pattern information. When the input particular pattern and the stored particular pattern information are identical, the particular pattern input by the user is determined to be the same as the previously input authentication data.

Meanwhile, in order to clearly describe the embodiment of the present invention, both the memory provided in the mobile device and an external database server may be collectively called a 'database'.

Here, the particular pattern may include at least any one of a motion pattern of the mobile device performed by the user, a keypad input pattern of the mobile device, a touch pattern of the mobile device, an emergency button input of the mobile terminal, and a particular voice input by the user.

Here, it is described that 'predetermined particular pattern information is input', and this is the same as a process of performing an 'agreed particular pattern behavior' by the user and recognizing the same by the mobile device.

For example, the particular pattern information may be received through a microphone by repeatedly pressing a particular key or a touch pad (toot, toot, too~woo) or by flapping (tick, tick, tic~ik) a surrounding portion of the mobile terminal at certain periods, and this method may be variably modified by a skilled person in the art according to aspects or designs of embodiments of the present invention.

It is substantially impossible to perform an operation of pressing a button to activate the mobile terminal in order to notify about an emergency rescue or an emergency. In consideration of this, technical characteristics of the present invention lie in that a mobile device is activated by simply inputting a particular pattern.

And then, when the particular pattern is authentication data previously input by the user, a user mode of the mobile device is changed to a self-reception mode as a mode previously determined by the user (S140).

Thereafter, a query previously stored in the database is output to the user through the mobile terminal to perform voice recognition (S150).

As for the query, a query previously established in the database to perform self-calling and emergency reporting may be selected, or a response pattern with respect to the query may be previously designated.

Thus, when a real-life situation takes place, the query previously stored in the database is output, and when the user makes a previously designated format of answer, the mobile device may perform voice recognition on the user's voice and outputs a response pattern as described hereinafter, as well.

Thereafter, a policy previously stored in the database is executed according to the user's voice recognition and response pattern (S160).

When the user's voice recognition is successfully performed, the policy previously stored in the database is output to the mobile terminal, and when the user makes a previously agreed format of answer such as 'Yes', 'No', 'Let me see', or the like, reacting to the situation is performed according to the previously stored policy. Details thereof will be described later with reference to FIG. 6.

Thereafter, when a personal identification number for termination is input by the user, the mobile device is changed to a standby mode (or an idle mode) (S170).

The policy previously stored in the database may be performed according to the user's voice recognition and response pattern, and when the performing of the policy is completed, the user may input a personal identification number (PIN) for termination to change the mobile device to a standby state.

The process of inputting the PIN for termination to change the mobile device to a standby mode is performed because a threatening person may forcibly take the user's mobile device to terminate it.

Although the threatening person forcibly performs termination, the mobile device waits for inputting of the PIN for termination by the user for a certain period of time even after the performing of the policy is terminated, as long as the PIN for termination is not input.

Here, although the threatening person forcibly releases a battery, a self-power supply process within the mobile device may be driven or an extra auxiliary battery may be used to actually transmit the user's location information, personal information, surrounding voice information, and video data to a third party such as a predetermined guardian, or the like, a security company, or police.

Figure 2:
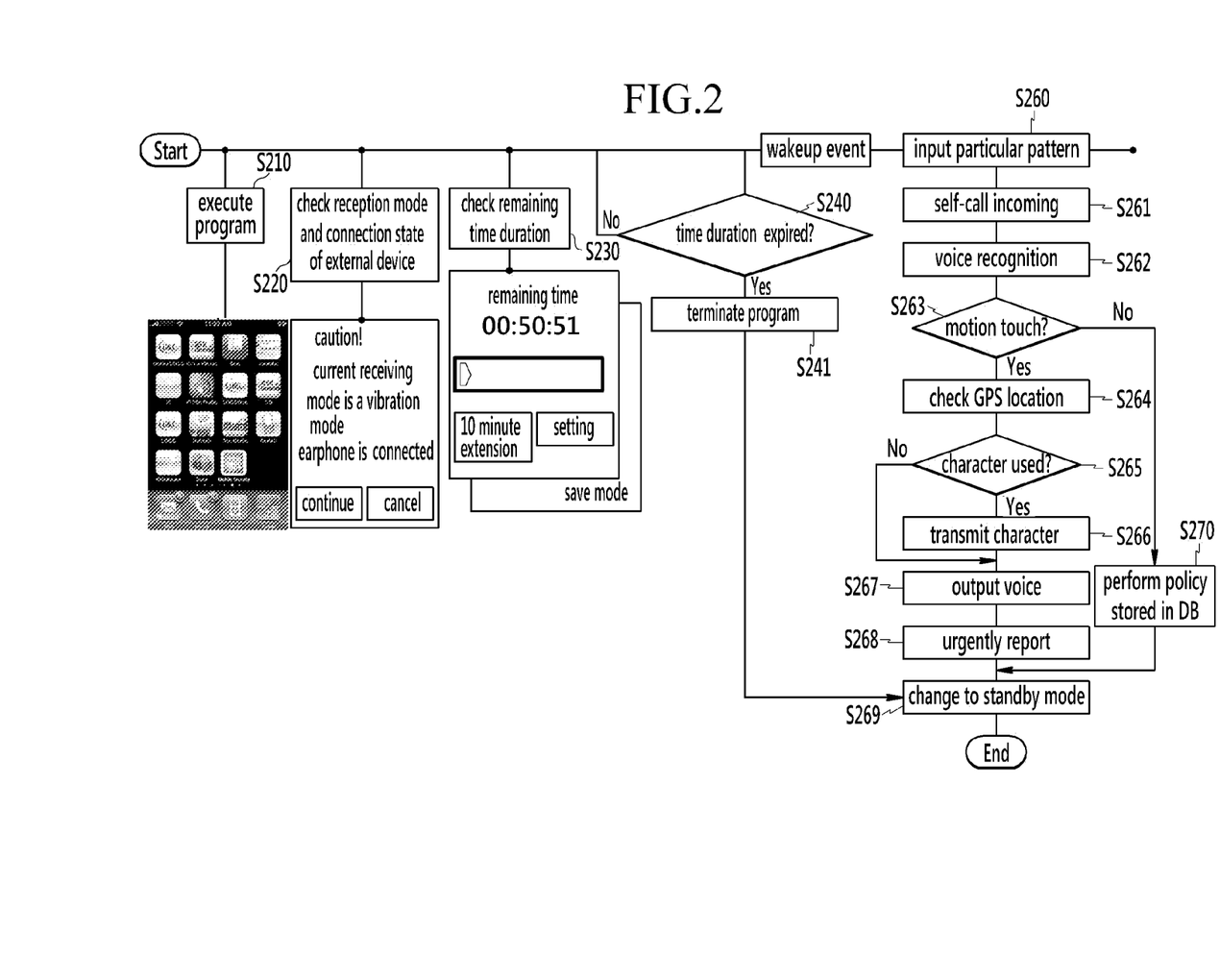
FIG. 2 is a detailed flow chart illustrating the method of self-calling and emergency reporting using a mobile device in FIG. 1.

FIG. 2 is a detailed flow chart illustrating the method of self-calling and emergency reporting using a mobile device in FIG. 1.

With reference to FIG. 2, the user may press an execution button of the self-calling program or the self-calling program at a time previously set by the user is executed (S210).

Then, the user's mobile terminal checks a reception mode and a connection state of an external device (S220). When the mobile terminal is set to a vibration mode or a mute mode, the object of the present invention as described above cannot be achieved.

Thus, in an embodiment of the present invention, when the reception mode of the user's mobile terminal is the vibration or mute mode, a message for inducing the user to change the current reception mode so that the user can directly change the mode.

Also, when an earphone is linked to an earphone port or connected to an external device such as Bluetooth, or the like, a message indicating that a self-calling service is not normally performed may be output.

Then, when the self-calling program is actually driven, a remaining time based on a time set by the user is displayed, and the user can check the remaining time (S230). The user may lengthen the remaining time as necessary.

Meanwhile, the mobile terminal checks whether or not the time duration has expired (S240), and when the pre-set time duration has expired, the self-calling program is automatically terminated (S241).

In addition, when a certain time has lapsed after the self-calling program of the mobile terminal was executed, the mobile terminal may enter a suspend mode, and here, in order to normally execute the self-calling program according to an embodiment of the present invention and prevent the mobile terminal from entering the suspend mode, the mobile terminal itself may execute a wakeup event at every particular period (S250).

In this manner, by executing the wakeup event at every particular period, the mobile terminal can be prevented from entering a standby mode and the self-calling service according to an embodiment of the present invention is normally executed.

Thereafter, while the mobile terminal is executing the self-calling program, when a particular pattern is input by the user (S260), it is determined whether or not the particular pattern is authentication data previously input by the user.

The particular pattern may include at least one of a motion pattern of the mobile device performed by the user, a keypad input pattern of the mobile device, a touch pattern of the mobile device, an emergency button input of the mobile device, and a particular voice input by the user.

Then, the user mode of the mobile device is changed to a self-reception mode, a mode previously determined by the user, and the user performs self-call incoming with respect to a call originated by the mobile terminal itself (S261).

Meanwhile, when the self-call incoming is performed (S261), the query previously stored in the database is output to the user through the mobile device, thus performing voice recognition (S262).

Thereafter, while the voice recognition is being performed, when a motion touch input is applied to the mobile terminal (S263), GPS information of the user is checked (S264), and when the user agrees matters regarding the use of characters (S265) for a pre-set third party, characters are transmitted to the third party previously set by the user (S266).

The characters transmitted to the third party may include situation information indicating that the user is in a dangerous situation, GPS information of the user, information regarding the user's surroundings, and information regarding voices of the surroundings.

And then, a voice with respect to emergency reporting is output from the mobile terminal (S267), and when the user agrees it and urgently reports it (S268), the mobile terminal is changed to a standby mode (S269).

Meanwhile, if there is no motion touch input to the mobile terminal from the user while the voice recognition is being performed (S263), a policy according to FIG. 7 described hereinafter is performed (S270).

Figure 3:
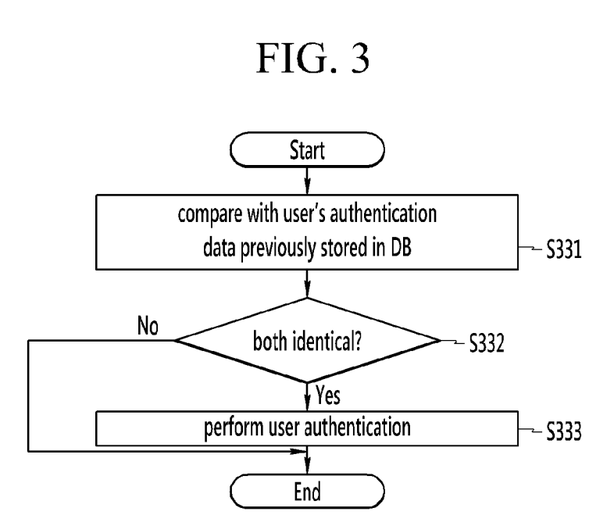
FIG. 3 is a detailed view of a step (S130) of determining whether or not it is authentication data of FIG. 1.

FIG. 3 is a detailed view of a step (S130) of determining whether or not it is authentication data of FIG. 1.

With reference to FIG. 3, it is checked whether or not a particular pattern input by the user is authentication data previously input by the user to the database (S331).

When the particular pattern input by the user is identical to the authentication data previously input by the user to the database (S332), user authentication is performed (S333).

If the particular pattern input by the user is different from the authentication data previously input by the user to the database, the particular pattern is disqualified as data with respect to user authentication.

In order to determine whether or not the particular pattern input by the user is identical to the authentication data previously input by the user to the database, a component for activating the mobile device in a standby state is required.

In an embodiment of the present invention, a driving process according to an embodiment of the present invention may be input to a registry of a start program of the mobile device to operate the mobile device any time, and by associating the driving process of an embodiment of the present invention to an activation button of the mobile device in the standby state, the mobile device may be executed.

Figure 4:
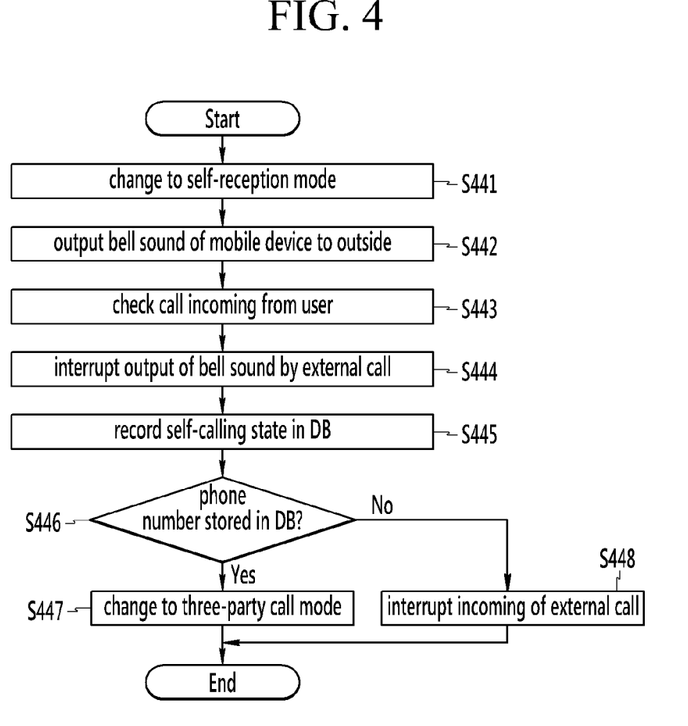
FIG. 4 is a detailed view of a step (S140) of changing a self-reception mode in FIG. 1.

FIG. 4 is a detailed view of a step (S140) of changing a self-reception mode in FIG. 1.

With reference to FIG. 4, when the pattern input by the user is identical to the authentication data previously input by the user to the database so user authentication is performed, the mobile device is changed to the self-reception mode (S441). The self-reception mode will be described later with reference to FIG. 5.

When the mobile device is changed to the self-reception mode, a bell sound of the mobile device is output to the outside (S442). This is to pretend that there is a phone call for the user to the threatening person in the situation in which the user is dangerous, and call incoming is required to be explicitly notified to the outside in order to call attention to the surroundings.

In this manner, in order to output a bell sound to the outside, the user may determine a bell sound and an output size of the bell sound in preparation for an emergency and store the same in the database in advance, and when the database receives a request for outputting the bell sound through user authentication, the database may automatically output the bell sound to the outside through the mobile device.

Meanwhile, when the mobile terminal checks call incoming from the user (S443), the mobile terminal interrupts a bell sound output according to an external call (S444).

This is to prevent an occurrence of a situation in which, currently, the user performs the process of making an inquiry to the user through the mobile terminal according to the previously determined policy, but the fact that the current call reception from the user is false is recognized or detected as a call from a third party is received in actuality.

Thus, when the mobile device checks call incoming from the user (S443), the mobile device interrupts a bell sound output according to an external call (S444) and records a self-calling state in the database to thus make preparation for a case in which a call is received from a third party.

Meanwhile, when a call is received from the third party, it is checked whether or not the call is a call stored in the database (S446), and when the call is a phone number stored in the database, the mobile device is change to a three-party call mode (S447). In this manner, when a call corresponding to the same phone number as that stored in the database is received, the mobile device is changed to the three-party call mode to inform about the current situation to the outside.

When the mobile device is changed to the three-party call mode, the mobile device of the user may simultaneously transmit situation information indicating that the user is currently in emergency, information regarding a location of the user, and information regarding external video of the user to a counterpart who performs the three-party call mode.

Meanwhile, when the call is not a phone number stored in the database, incoming of the external call is interrupted (S448).

Figure 5:
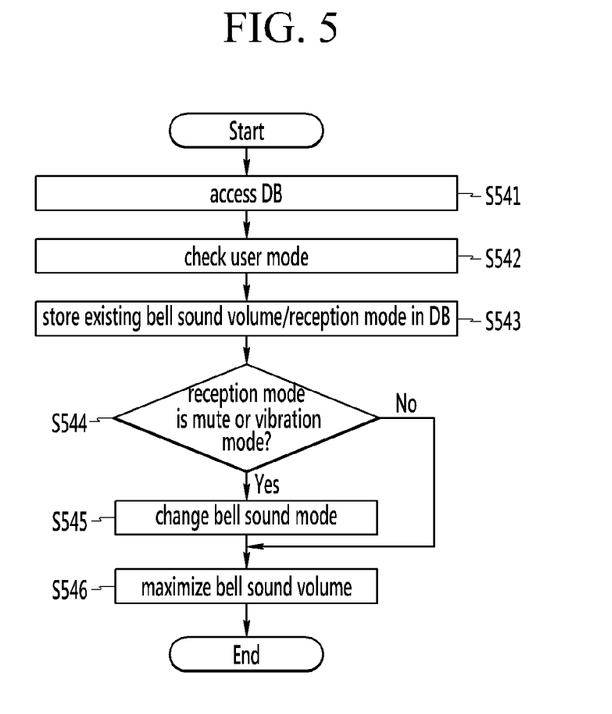
FIG. 5 is a detailed flow chart illustrating a step (S441) of changing a self-reception mode in FIG. 4.

FIG. 5 is a detailed flow chart illustrating a step (S441) of changing a self-reception mode in FIG. 4.

With reference to FIG. 5, first, a user database is accessed by the controller of the mobile terminal (S541) and a user mode is checked (S542).

Here, information regarding whether or not a current user mode of the mobile device is a bell sound mode and a current size of the bell sound volume of the mobile device are stored in the database (S543).

Meanwhile, whether or not a reception mode of the mobile device is a mute or vibration mode is checked (S544), the mobile device is changed to a bell sound mode (S545), and then, the volume of the bell sound is changed to be maximized (S546).

When the reception mode of the user's mobile device is the bell sound mode, the volume of the bell sound is changed to be maximized (S546).

Namely, the self-reception mode corresponds to a mode previously stored by the user in the database, and may include information regarding as to whether or not a call reception mode of the mobile device is the bell sound mode, the vibration mode, or the mute mode, information regarding the size of the volume of the bell sound, and information regarding interruption of a call reception of a third party.

The self-reception mode according to an embodiment of the present invention may include a bell sound mode, a maximum volume of bell sound, and setting of the mobile terminal with respect to interruption of a call reception from a third party not stored in the database.

Figure 6:
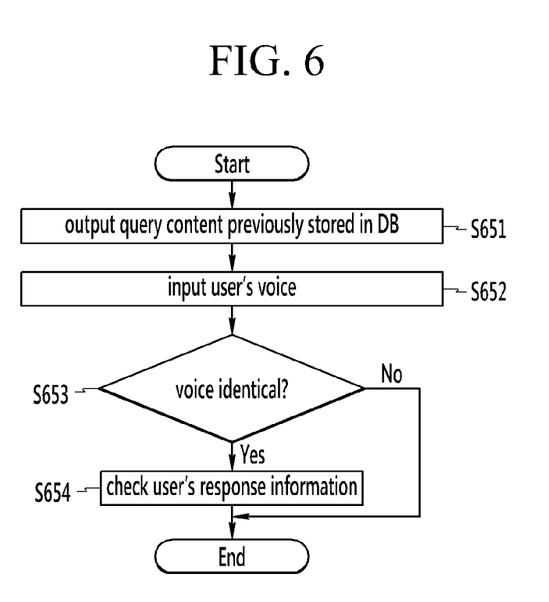
FIG. 6 is a detailed flow chart illustrating a step (S150) of recognizing a voice in FIG. 1.

FIG. 6 is a detailed flow chart illustrating a step (S150) of recognizing a voice in FIG. 1.

With reference to FIG. 6, the query stored in the database is output to the user (S651), and when a user's voice is input according to the output query (S652), it is determined whether or not the user's voice according to the query and the user's voice previously stored in the database are identical (S653). When the user's voice according to the query and the user's voice previously stored in the database are identical, the user's response information is checked (S654).

Figure 7:
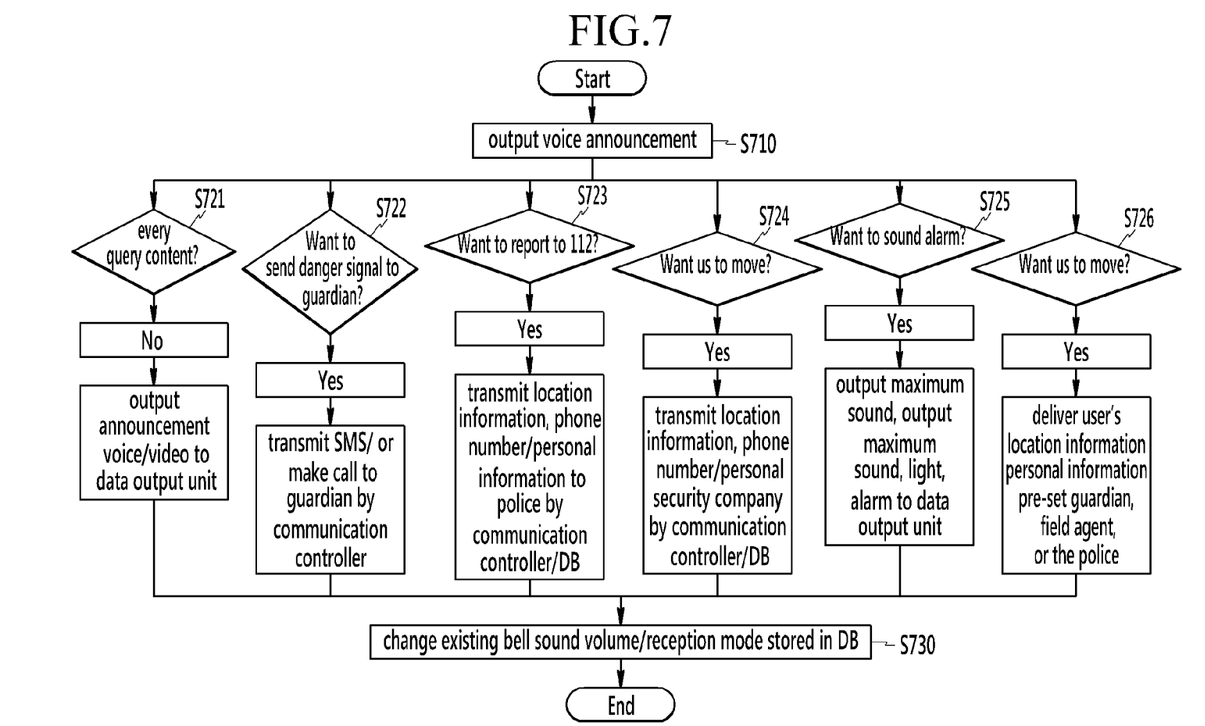
FIG. 7 is a detailed flow chart of a step (S160) of executing a policy previously stored in a database of FIG. 1.

FIG. 7 is a detailed flow chart of a step (S160) of executing a policy previously stored in a database of FIG. 1.

With reference to FIG. 7, upon authenticating the user, voice announcement is output, and the voice announcement may be as follows.

Here, when the user makes answers to all of the queries (S721) as No, a announcement voice or video is output to a data output unit.

When the user says 'Yes' with respect to an announcement "Want to send a danger signal to guardian?" (S722), a communication controller informs the guardian accordingly through an SMS or a call.

Of curse, at the same time, information regarding a current location of the user, surrounding photograph information, surrounding video information, or surrounding voice information may also be transmitted together.

When the user says "Yes" with respect to an announcement "Want to report to 112?" (S723), the communication controller informs the guardian accordingly through an SMS or a call and simultaneously transmits user's location information, phone number, personal information, and the like, to the police or a security company.

When the user says "Yes" with respect to an announcement "Want us to move?" (S724), the communication controller informs the guardian accordingly through an SMS or a call and simultaneously transmits user's location information, phone number, personal information, and the like, to the security company.

When the user says "Yes" with respect to an announcement "Want to sound an alarm?" (S725), an alarm may be output with a maximal bell sound of the mobile terminal or a light source may be beamed by using the mobile device itself.

Meanwhile, when the standby time has lapsed (S726), the user's location information or personal information may be delivered to a pre-set guardian, field agent, or the police.

Namely, when the user is in a very dangerous situation, the user may not make any answer. Thus, the user may set a standby time in advance, and thereafter, when there is no answer from the user during the pre-set standby time, the pre-set guardian, the field agent, or the police may be informed that the user is in a very dangerous situation, thus protecting the user.

Figure 8:
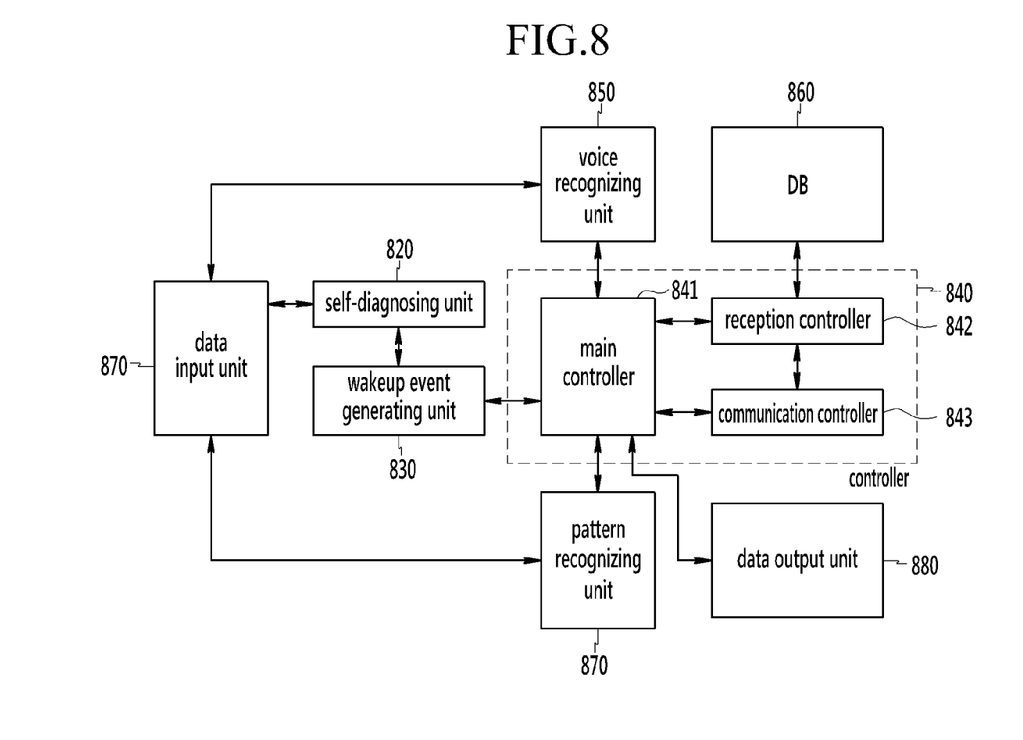
FIG. 8 is a block diagram of a system of self-calling and emergency reporting by setting a time in a mobile terminal according to an embodiment of the present invention.

FIG. 8 is a block diagram of a system of self-calling and emergency reporting by setting a time in a mobile terminal according to an embodiment of the present invention.

In describing the system of self-calling and emergency reporting by setting a time in a mobile terminal, repeated matters as those described above will be omitted for clarification of the present invention.

With reference to FIG. 8, the system of self-calling and emergency reporting using a mobile device may include a data input unit 810, a self-diagnosing unit 820, a wakeup event generating unit 830, a controller 840, a voice recognizing unit 850, a database 860, a pattern recognizing unit 870, and a data output unit 880.

The controller 840 may include a main controller 841, a reception controller 842, and a communication controller 843.

The data input unit 810 receives a particular pattern input by the user in the occurrence of an emergency, receives a user's response according to a query previously stored in the database, and receives the user's personal identification number for termination.

Here, inputting of a particular pattern refers to performing an 'agreed particular pattern behavior' by the user and recognizing the same by the mobile device.

In order to determine whether or not the particular pattern is authentication data which has been previously input by the user, particular pattern information may be previously stored in the memory provided in the mobile device or an external interface server, and when the particular pattern is input by the user, it is compared with the stored particular pattern information. When the particular pattern is input by the user is identical to the stored particular pattern information, it is determined that the particular pattern input by the user is the same as the previously input authentication data.

Here, the particular pattern may include at least any one of a motion pattern of the mobile device, a keypad input pattern of the mobile device, a touch pattern of the mobile device, an emergency button input of the mobile device, and a particular voice input by the user.

The self-diagnosing unit 820 may inform the user about a user reception mode and a connection state of an external device connected to the mobile terminal when the self-calling program of the mobile terminal is executed.

This is to determine whether or not the mobile terminal is in a bell sound mode at an initial stage in executing the self-calling program, because the mobile terminal should be set in the bell sound mode, rather than vibrations or a mute mode, in order to normally execute the self-calling program.

In addition, when the mobile terminal is connected to an acoustics device including an earphone, a head phone, or the like, or connected to a Bluetooth device, a bell sound of the mobile terminal of the user cannot be heard outside, so it is checked whether or not the mobile terminal is connected to an external device.

Meanwhile, when the self-calling program of the mobile terminal is executed, a remaining time of the self-calling program is displayed on liquid crystal of the mobile terminal, and before the remaining time lapses, the execution time duration of the self-calling program may be lengthened.

When a certain period of time lapses after the self-calling program of the mobile terminal is executed, the mobile terminal may enter a suspend model. Thus, in order to normally execute the self-calling program, the wakeup event generating unit 830 prevents the mobile terminal from entering the suspend mode.

Since the wakeup event generating unit 830 executes the wakeup event at every particular period, the mobile terminal is prevented from entering a standby mode and the self-calling program according to an embodiment of the present invention is normally executed.

The controller 840 checks whether or not the input particular pattern is authentication data previously input by the user to perform user authentication, changes a user mode of the mobile terminal to a self-reception mode, a mode previously input to the database, through user authentication, executes the policy stored in the database according to the user's voice recognition and response pattern, and transmits user data including the user's current location information to a third party previously input to the database.

The voice recognizing unit 850 performs voice recognition based on the user's response to the query previously stored in the database.

The controller 840 may include the main controller 841 for determining whether or not the input particular pattern is authentication data previously input by the user to perform user authentication and execute the policy stored in the database according to the user's voice recognition and response pattern, the reception controller 842 configured to change the user mode of the mobile device to the self-reception mode, a mode previously input to the database, through the user authentication, and the communication controller 843 conthe query is identical to the user's voice previously stored in the database. When the user's voice according to the query is identical to the user's voice previously stored in the database, the voice recognizing unit 850 checks the user's response information.

The main controller 841 may execute the policy stored in the database, and then, terminate the self-reception mode of the mobile device.

Figure 9:
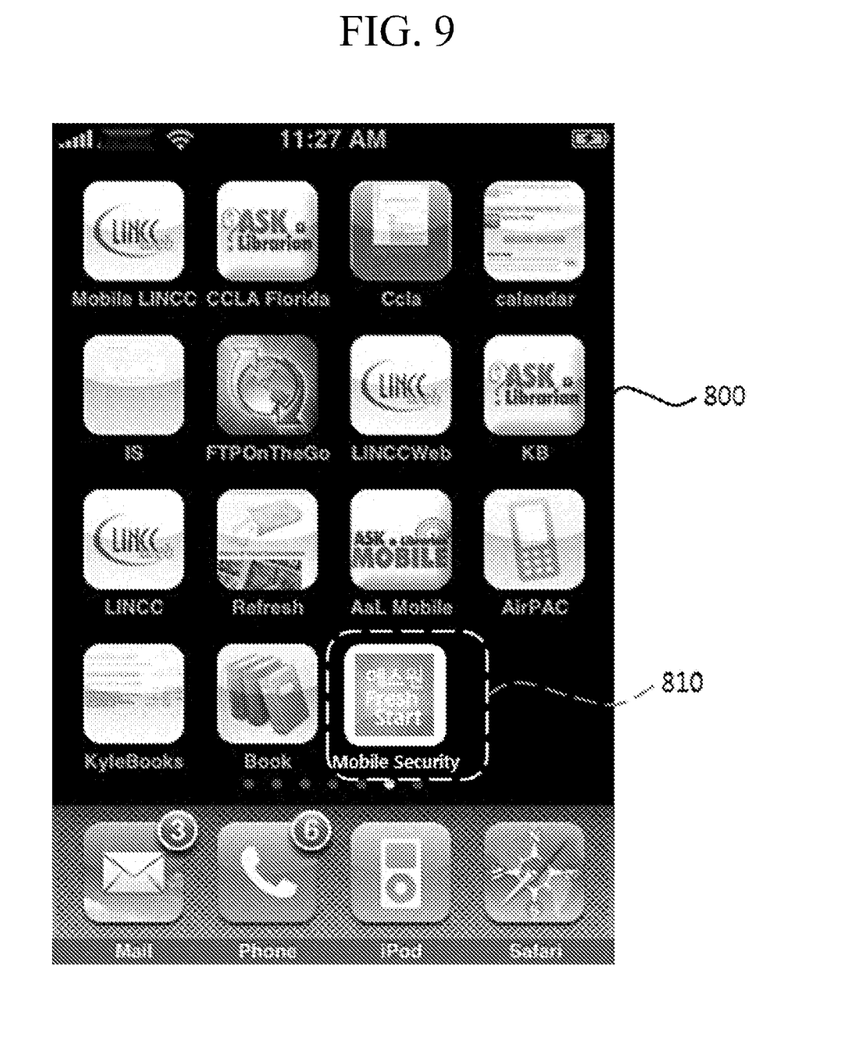
FIG. 9 is a view illustrating an embodiment of the system of self-calling and emergency reporting by setting a time in a mobile device according to an embodiment of the present invention.

FIG. 9 is a view illustrating an embodiment of the system of self-calling and emergency reporting by setting a time in a mobile device according to an embodiment of the present invention.

With reference to FIG. 9, first, the user downloads a program posted in a mobile store by a security company to the mobile device and installs it in the mobile device.

Currently, mobile stores are largely operated on smart phone basis, and smart phone app stores are as shown in Table 1 below.

TABLE 1

| OS | company | App store | Web address | terminal |
|---|---|---|---|---|
| RIM | Research In Motion | Blackberry App world | blackberry.com/services/appworld | Blackberry BOLD 9000 |
| Symbian | Nokia | Ovi store | ovi.com/services | Nokia 5800 Xpress |
| Android | Google | Android market | android.com/market | Motorola Droid |
| Window mobile | Microsoft | Windo mobile market place | microsoft.com/ windowsmobile/catalog/cataloghome.aspx | Sony Ericsson XPERIA, SAMSUNG OMNIA, LG INSITE |
| Window mobile | Samsung | Bada | bada.com | OMNIA 2 |
| iPhone OS | Apple | App for iPhone | apple.com/iphone/apps-for-iphone | iPhone | figured to transmit user data including the user's current location information to a third party previously input to the database.

Meanwhile, the reception controller 842 may change the mobile device to a bell sound mode, and change the size of the bell sound of the mobile device to a predetermined size.

Also, the user data of the communication controller 843 may include at least any one of the user's current location information, the user's phone number, the user's input voice, a still image input to a camera module of the mobile device, and video data.

When the particular pattern is authentication data previously input by the user, the main controller 841 may automatically execute a particular program installed in the mobile device or transmit an emergency rescue message by the mobile device.

When a bell sound is output to the mobile device according to the change of the mobile device to the self-reception mode, the communication controller 843 checks call incoming from the user, and when the call incoming is performed, the communication controller 843 interrupts an output of a bell sound according to an external call, records the self-calling state in the database, and checks whether or not a phone number of the external call is identical to a phone number stored in the database. When the phone number of the external call is identical to a phone number stored in the database, the communication controller 843 changes the mobile device to a three-party call mode. When the phone number of the external call is different from a phone number stored in the database, the communication controller 843 may interrupt incoming of the external call.

Also, an announcement is output to the user by the data output unit 880 according to the query stored in the database, the voice recognizing unit 850 recognizes the user's voice, and determines whether or not the user's voice according to App for iPhone based on Apple operated by Apple Inc., bada based on a window mobile to Samsung Co., Ltd., android market based on Android to Google, and the like, are operated as representative smart phone app stores, and the user may purchase a particular program through the smart phone app stores and install the same.

The user may perform the self-calling and emergency reporting according to an embodiment of the present invention by directly executing a program icon 910 according to a program installed on the screen 900 of the mobile device, or may input the particular pattern as described above to automatically execute the program.

The method of self-calling and emergency reporting by setting a time in a mobile terminal according to embodiments of the present invention may be executed through software. When executed by software, the constituent elements of the embodiments of the present invention are code segments executing required operations.

Programs or code segments may be stored in a processor readable medium or transmitted by a computer data signal combined with a carrier in a transmission medium or a communication network.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, Blu-ray disks, optical data storage devices, and the like.

The computer readable recording medium may also be distributed to computer devices connected by a network so that the computer readable codes are stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of self-calling and emergency reporting by setting a time in a mobile terminal, the method comprising:
(a) continuing to execute a self-calling program according to an execution time duration input by a user of the mobile terminal;
(b) when a particular pattern of the user is input to the mobile terminal while the self-calling program is being executed, determining, by the mobile terminal, whether or not the particular pattern is authentication data previously input by the user, and changing the mobile terminal into a self-reception mode predetermined by the user when the particular pattern is the authentication data, in which the self-reception mode is associated with checking at the mobile terminal with respect to a call originated by the mobile terminal itself;
(c) when the mobile terminal is in the self-reception mode, checking call incoming from the user, entering a self-calling state for, according to a phone number of an external call, interrupting the external call and changing to a three-party call mode including the external call, and outputting a query previously stored in a database to the user through the mobile terminal to perform voice recognition;
(d) executing a policy previously stored in the database according to the user's voice recognition and a response pattern according to the query; and
(e) terminating the self-reception mode and placing the mobile terminal in a standby mode when a personal identification number is input by the user or according to an end time of the execution time duration.

2. The method of claim 1, wherein the step of (a) comprises:
when the self-calling program of the mobile terminal is executed, notifying the user about a user reception mode of the mobile terminal and a connection state of an external device connected to the mobile terminal.

3. The method of claim 1, wherein the step of (a) further comprises:
when the self-calling program is executed, displaying a remaining execution time duration, and lengthening the remaining execution time duration of the self-calling program according to a user request before the remaining execution time duration lapses.

4. The method of claim 1, wherein the information regarding an execution time duration of the self-calling program is input by the user in advance or is input by the user after the self-calling program is executed.

5. The method of claim 1, wherein the step of (a) further comprises:
executing a wakeup event for preventing the mobile terminal from entering a suspend mode at every predetermined period.

6. The method of claim 1, wherein the particular pattern comprises at least one selected from the group consisting of a user's motion pattern, a keypad input pattern of the mobile terminal, a touch pattern of the mobile terminal, an emergency button input of the mobile terminal, and the user's voice.

7. The method of claim 1, wherein the step of (b) comprises:

comparing a user's particular pattern input to the mobile terminal with authentication data of the user previously stored in the database to determine whether or not they are identical; and
when the particular pattern and the user's input data are identical, performing user authentication.

8. The method of claim 1, wherein the step of (b) further comprises:
when the particular pattern is authentication data previously input by the user, changing the mobile terminal to a bell sound mode; and
when the mobile terminal is changed to the bell sound mode, changing a bell sound of the mobile terminal and its volume to a bell sound and volume stored in the database.

9. The method of claim 1, wherein the step of (c) comprises:
outputting a bell sound from the mobile terminal which has been changed to the self-reception mode;
interrupting an output of a bell sound according to the external call when the call incoming from the user is determined to be performed from the checking and recording the self-calling state in the database;
when the call incoming performed from the user to the mobile terminal is determined to be performed, determining whether or not the phone number of the external call is identical to a phone number stored in the database; and
when the phone number of the external call is identical to the phone number stored in the database, changing the mobile terminal to the three-party call mode, and when the phone number of the external call is different from the phone number stored in the database, interrupting incoming of the external call.

10. The method of claim 1, wherein the step of (c) further comprises:
outputting the query stored in the database to the user;
when the user's voice is input according to the query, determining whether or not the user's voice according to the query is identical to the user's voice previously stored in the database; and
when the user's voice according to the query is identical to the user's voice previously stored in the database, checking user's response information.

11. The method of claim 1, wherein the step of (e) comprises:
after the policy stored in the database is executed, terminating the self-reception mode of the mobile terminal.

12. The method of claim 1, wherein the step of (e) comprises:
when data different from the user's specific personal identification number is input to the mobile terminal, maintaining the self-reception mode.

13. The method of claim 1, wherein the database comprises a memory installed in the mobile terminal or an external database server.

14. The method of claim 1, wherein the step of (b) comprises:
when the particular pattern is authentication data previously input by the user, storing at least one of user data selected from the group consisting of the user's current location information, the user's phone number, the user's input voice, and video data input to a camera module of the mobile terminal in the database; and
transmitting the user data to a third party previously stored in the database.

15. A non-transitory recording medium storing the method of claim 1, as a program that can be executed in a computer.

16. A system of self-calling and emergency reporting by setting a time in a mobile terminal, the system comprising:
a data input unit for receiving a particular pattern from a user of the mobile terminal when an emergency occurs, receiving the user's response according to a query previously stored in a database, and receiving the user's personal identification number for termination of a self-reception mode;
for checking a user reception mode of the mobile terminal and a connection state of an external device connected to the mobile terminal when information regarding an execution time duration of a self-calling program is received from the data input unit;
a controller for determining whether or not the input particular pattern is authentication data previously input by the user to perform user authentication, change a user mode of the mobile terminal to the self-reception mode as a mode previously input to the database according to the user authentication, in which the self-reception mode is associated with checking at the mobile terminal with respect to a call originated by the mobile terminal itself; when the mobile terminal is in the self-reception mode, checking call incoming from the user and entering a self-calling state for, according to a phone number of an external call, interrupting the external call and changing to a three-party call mode including the external call; executing a policy stored in the database according to the user's voice recognition and response pattern; and transmitting user data including information regarding the user's current location to a third party previously input to the database; and
a voice recognizing unit for performing voice recognition based on the user's response according to the query previously stored in the database.

17. The system of claim 16, wherein when a command for executing the self-calling program is received from the data input unit, the self-diagnosing unit displays a remaining execution time duration of the self-calling program, and
when a request for lengthening execution of the self-calling program is received from the data input unit before the remaining execution time duration lapses, the self-diagnosing unit lengthens the remaining execution time duration of the self-calling program.

18. The system of claim 16, wherein the information regarding the execution time duration of the self-calling program is previously input by the user or is input after the self-calling program is executed.

19. The system of claim 16, further comprising:
a wakeup event generating unit for executing a wakeup event for preventing the mobile terminal from entering a suspend mode at every particular period.

20. The system of claim 16, wherein the particular pattern comprises at least one selected from the group consisting of a motion pattern of the mobile terminal performed by the user, a keypad input pattern of the mobile terminal, a touch pattern of the mobile terminal, an emergency button input of the mobile terminal, and a particular voice input by the user.

21. The system of claim 16, wherein the controller comprises:
a main controller for determining whether or not the input particular pattern is authentication data previously input by the user to perform user authentication, and executing the policy stored in the database according to the user's voice recognition and response pattern;
a reception controller for changing the user mode of the mobile terminal to the self-reception mode as a mode previously input to the database according to the user authentication; and
a communication controller for transmitting the user data including the information regarding the user's current location to a third party previously input to the database.

22. The system of claim 21, wherein the reception controller changes the mobile terminal to a bell sound mode, and change the bell sound of the mobile terminal to a predetermined size.

23. The system of claim 21, wherein the user data of the communication controller comprises at least one selected from the group consisting of user data among the information regarding the user's current location, the user's phone number, the user's input voice, and video data input to a camera module of the mobile terminal.

24. The system of claim 21, wherein when the particular pattern is authentication data previously input by the user, the main controller automatically executes a particular program installed in the mobile terminal or transmits an emergency rescue message by the mobile terminal.

25. The system of claim 21, wherein when a reception tone is sent to the mobile terminal according to the change to the self-reception mode, the communication controller checks the call incoming from the user, and when the call incoming is determined to be performed, the communication controller interrupts an output of a bell sound, and records the self calling state in the database, and
checks whether or not the phone number of the external call is identical to a phone number stored in the database, and when the phone number of the external call is identical to the phone number stored in the database, the communication controller changes the mobile phone to a three-party call mode, and
when the phone number of the external call is different from the phone number stored in the database, the communication controller interrupts the incoming of the external call.

26. The system of claim 21, wherein after the main controller executes the policy stored in the database, the main controller terminates the self-reception mode of the mobile terminal.

27. The system of claim 16, wherein when the user's voice is input according to the query stored in the database, the voice recognizing unit determines whether or not the user's voice according to the query and a user's voice previously stored in the database are identical, and when the user's voice according to the query and a user's voice previously stored in the database are identical, the voice recognizing unit checks the user's response information.

* * * * *